Aug. 28, 1951
R. C. MARCY ET AL
2,565,566
AUTOMATIC MECHANISM FOR CONTROLLING THE
OPERATION OF MACHINES
Filed June 21, 1946
4 Sheets-Sheet 1
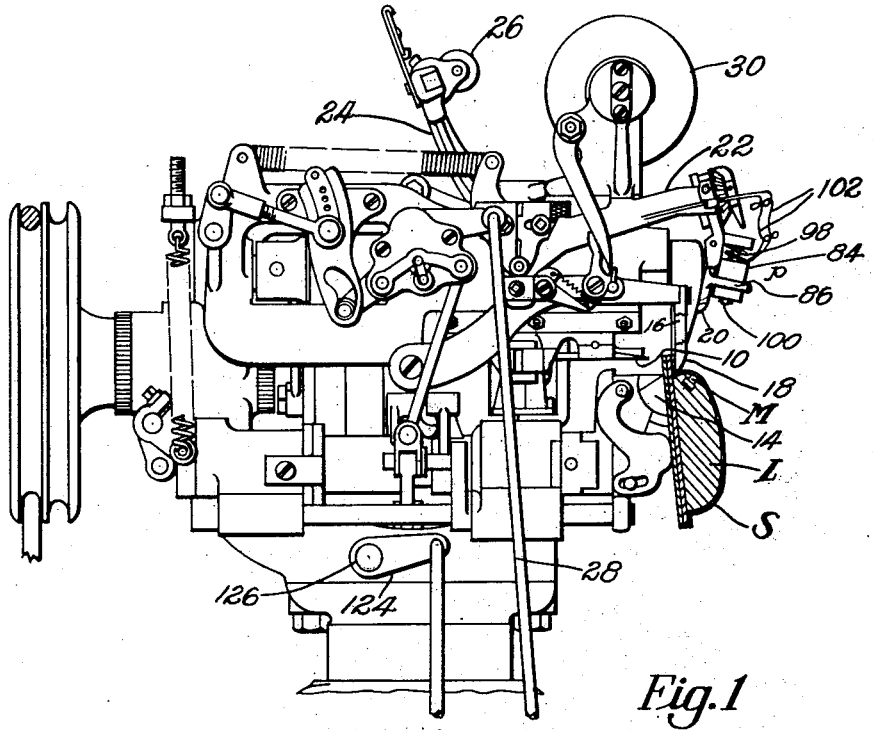
Fig.1
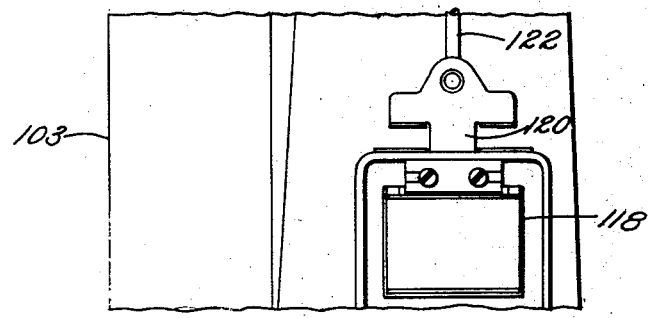
Inventors
Richard C. Marcy
Robert R. Perron
By their Attorney

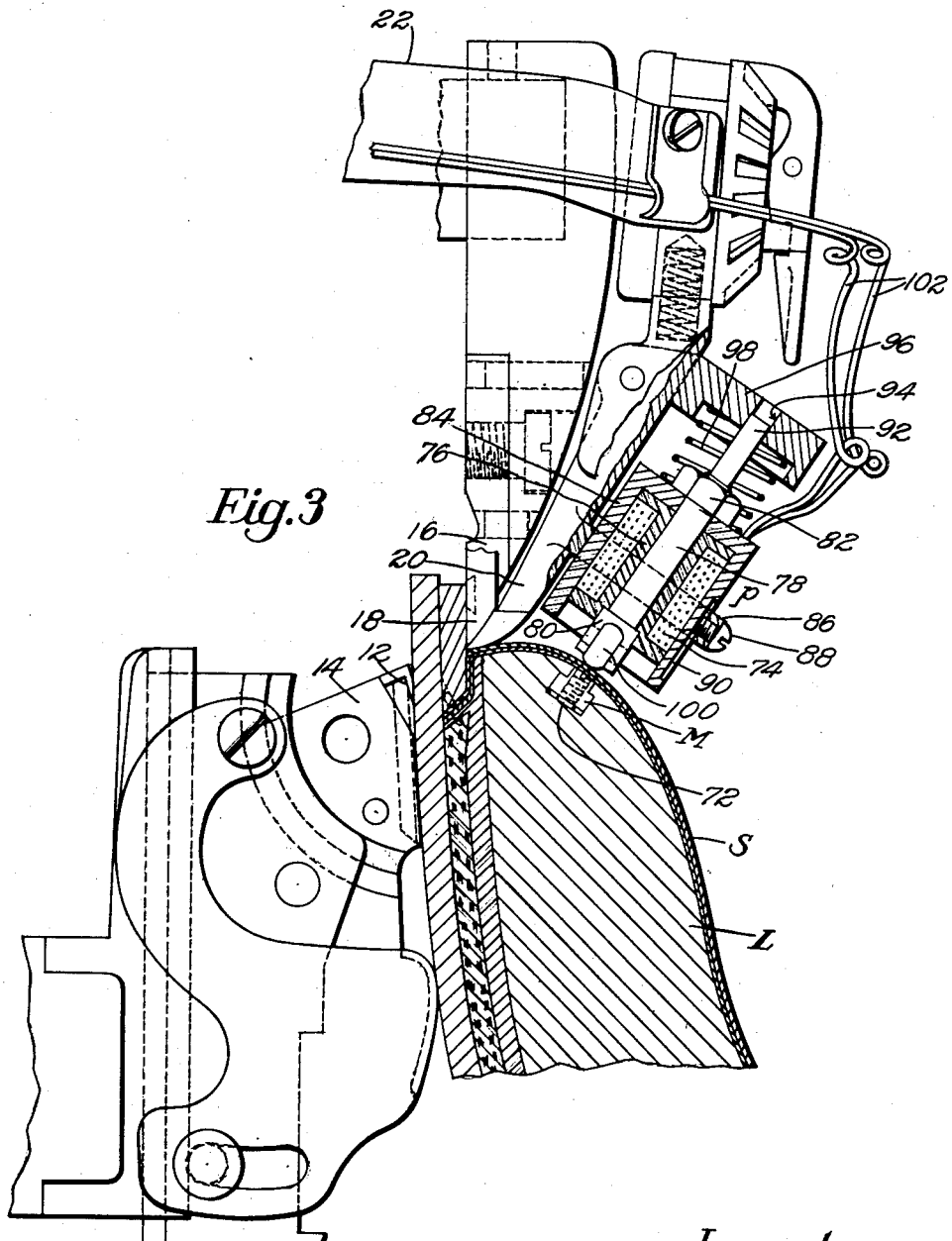

Aug. 28, 1951

R. C. MARCY ET AL 2,565,566

AUTOMATIC MECHANISM FOR CONTROLLING THE
OPERATION OF MACHINES

Filed June 21, 1946

Inventors
Richard C. Marcy
Robert R. Perron
By their Attorney

Patented Aug. 28, 1951

2,565,566

UNITED STATES PATENT OFFICE 2,565,566

AUTOMATIC MECHANISM FOR CONTROLLING THE OPERATION OF MACHINES

Richard C. Marcy, Marblehead, and Robert R. Perron, Salem, Mass., assignors to United Shoe Machinery Corporation, Flemington, N. J., a corporation of New Jersey Application June 21, 1946, Serial No. 678,398

5 Claims. (Cl. 12—18)

This invention relates to the control of mechanisms or machines employed for the performance of various functions, it being more particularly concerned with effecting the operation of the controlled instrumentality at a definite time in an operating cycle or at a definite point upon the work. There are frequent instances in which it is customarily left to an operator to determine, by special act on his part, when or where an operation upon work shall be initiated or terminated. This not only imposes upon the operator a considerable burden, but necessarily introduces uncertainty as to the occurrence of the time and place of action. It is an object of our invention to relieve the operator of the burden of thus exercising control by effecting it automatically and with unfailing accuracy for every piece of work.

For the attainment of this end, the invention is concerned with controlling the operation of a mechanism or machine, for example, one by which work is formed during its advance or other change in the relative positions of the work and forming mechanism, though by no means limited to this field. More particularly, a special condition distinct from the normal work structure is detected during the change in relation between the work structure and the forming mechanism, and is utilized to govern the operation upon the work. This principle is especially applicable to cases in which the operator's attention is directed to other matters, as holding the work during its advance or initiating a plurality of closely related operations.

The preferred manner of creating the condition to be detected consists in associating with the work a controlling device, the location of which has a predetermined relation to the point on the work at which a change in the operation is desired. A useful application of our invention may be made in machines for rounding soles attached to lasted shoe-uppers, the above-mentioned controlling device being inserted in the last. With such a machine is associated, in accordance with one feature of the invention, a sensing device, and the work with its controlling device is presented to the machine, and advanced for the sole rounding operation to bring the controlling device into cooperative relation with the sensing device, thereby causing the sensing device to govern the operation of the machine. One simple and flexible arrangement utilizes an electrical sensing device constructed and arranged to be activated by the controlling device which, as herein disclosed, is in the form of a magnetic member. To permit the time when the sensing device is activated to be accurately determined, or varied readily, the magnetic member, as herein shown, is mounted in a groove extending along the periphery of the last and has means by which it may be secured in different positions in the groove.

In the case of the illustrated machine, the governing action referred to above is imparted to guiding means, such as the usual forepart guide for example, for presenting the work differently to the rounding knife whereby the sole-edge-extension of the shoe is varied.

One efficient type of sensing means comprises a pickup coil carried by the forepart-guide, in which coil an electrical response is produced whenever the magnetic member on the work is brought into proximity to the coil. The coil may be yieldably mounted upon the guide, having a portion contacting with the advancing work so its relation to the controlling means of every work-piece of a group will be the same. The combination further includes electrical means responsive to changes in the pickup-coil and furnishing therewith the sensing means of the invention, and a solenoid energized by the electrical means and through which the operation of the machine is more directly controlled.

In the accompanying drawings illustrating an embodiment of our improved controlling mechanism, usable in connection with one of the many possible applications of our invention.

Fig. 1 is a broken side elevation of a rounding and channeling machine to which the invention is applied;

Fig. 2, an enlarged partial elevation of the side of the machine opposite that appearing in Fig. 1;

Fig. 3, a still greater broken enlargement of the elements more directly connected with the present invention and viewed as in Fig. 1;

Figure 6:
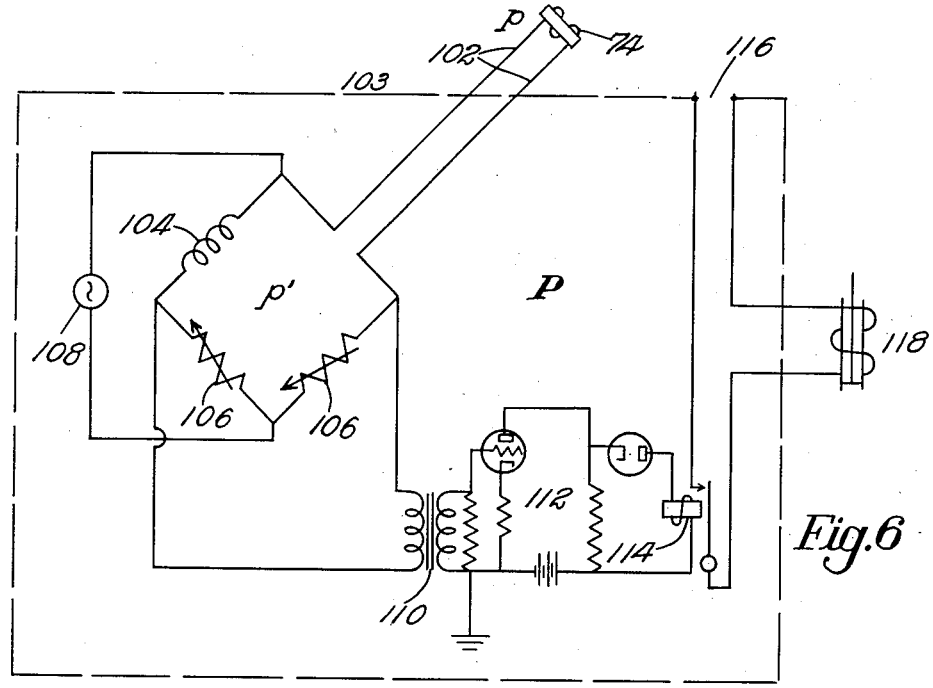

Fig. 6, a diagram of an electrical circuit through which control may be exercised.

Figure 2:
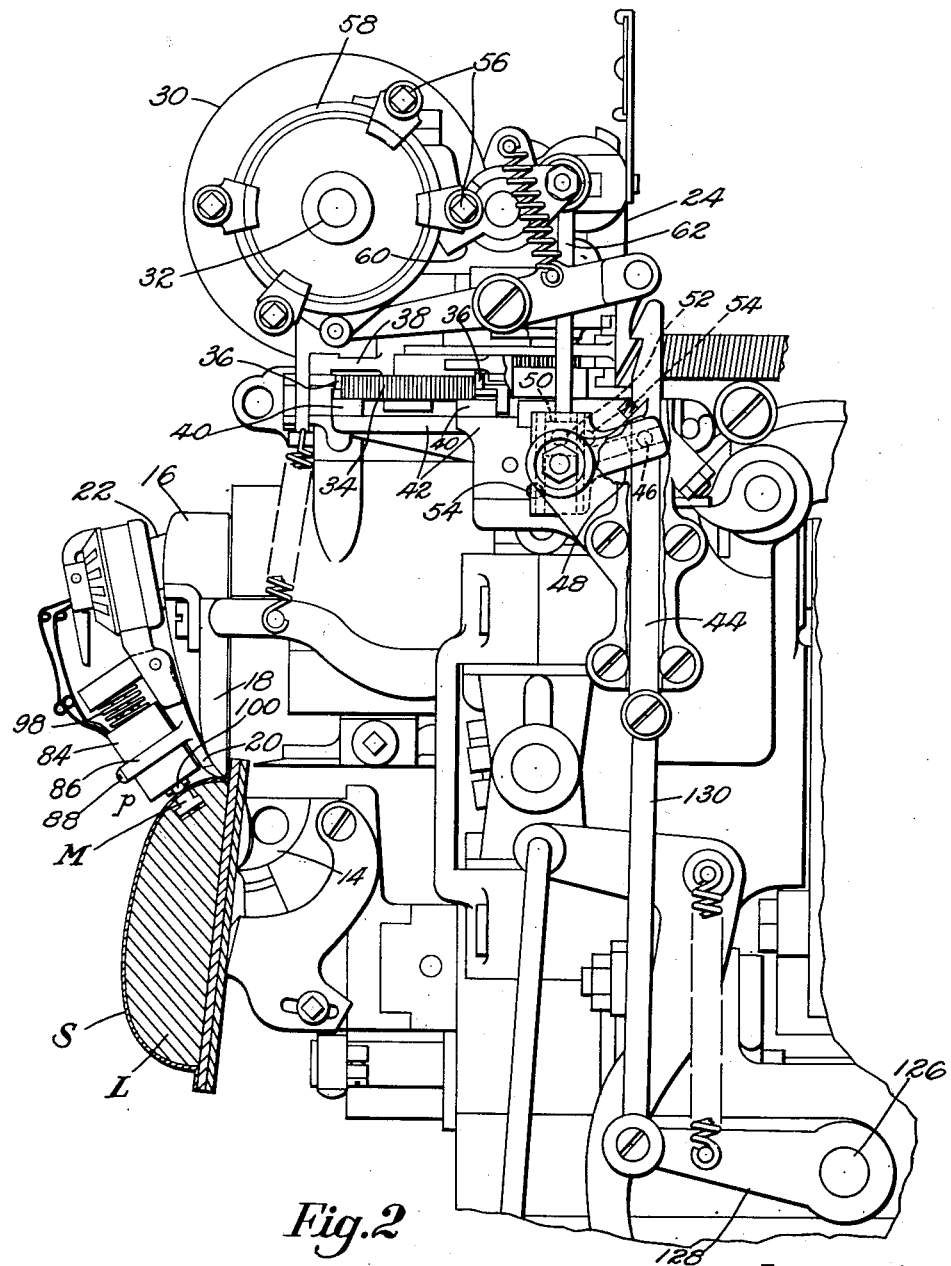

Figs. 1, 2 and 3 of the drawings illustrate portions of a well-known commercial shoe machine, identified in the trade as the Goodyear Universal Rounding and Channeling Machine, Model E, and disclosed in Letters Patent of the United States No. 1,030,606, Perry, June 25, 1912. By this apparatus, a shoe-sole temporarily attached to a lasted shoe-upper is trimmed to an approximate peripheral contour by a reciprocatory chopping knife 10 and simultaneously channeled by an oscillatory knife 12 for the reception of the stitching which finally attaches the sole to a welt carried by the upper. The work is advanced step by step for these operations by the oscillation of a bottom-rest or channel-knife-block 14 and an opposed oscillatory feed-arm 16. The feed-arm swings between the opposite sides of a U-shaped guide 18, which receives the crease between the upper and welt, and during a portion of the operation determines the vertical relation between the work and the chopping knife and therefore the width to which the sole-edge is rounded. For present purposes, it will be assumed that the crease-guide is effective at both sides of the shank and about the forepart from the inside ball-line to the outside tip-line. The contour of the remainder of the forepart is determined by a guide 20 engaging the shoe-upper and variable as to its vertical position to produce a sole-edge-extension of the desired form. The guide 20 is attached to the forward extremity of an arm 22 pivoted upon the frame of the machine and provided with an extension 24, upon which a roll 26 is rotatable. Upon actuation of a treadle-rod 28 by the operator, the forepart-guide is lowered from the position appearing in Fig. 1 to take control of the work (Figs. 2 and 3), the crease-guide 18 rising to an inactive position. The roll 26 is now in contact with the selected one of a series of cams 30 (conventionally indicated by a circle) rotatable by a shaft 32. The periphery of the cam is so formed that, as it turns, it will permit the left shoe of a pair to rise between the outer ball-line and outer tip-line and the right shoe to be lowered between the outer tip-line and the outer ball-line. The work-movements thus produced will cause the chopping knife 10 to round the two sole-extensions to the desired form and the knife 12 to cut similar channels. To thus turn the cam in opposite directions for operation upon the two soles, and as is described in detail in the previously mentioned patent, a ratchet-wheel 34 rotatable upon the head of the machine is geared to the shaft 32 through a frictional connection. The ratchet-wheel may be alternately engaged and rotated in opposite directions by two pawls 36, 36 carried by a constantly oscillating lever 38. The engagement of the pawls is controlled by two guards or masks 40, 40 carried by respective horizontal slides 42, 42. To withdraw one of the guards from its pawl to allow this to engage the ratchet-wheel and start the cam in rotation for controlling the sole-extension of one shoe of a pair, a vertical slide-bar 44 is depressed. A projection 46 from the slide-bar turns clockwise (Fig. 3) a bell-crank-lever 48 fulcrumed upon the head. In vertical ways in an arm of this lever a block 50 is movable, this block having an outward projection 52. The projection 52, depending upon whether its block is above or below the fulcrum of the lever, will strike in its movement one or the other of two projections 54, 54 from the respective slides 42, 42, thereby withdrawing the corresponding guard 40 from its pawl 36. The pawl will therefore engage the ratchet-wheel 34 and rotate the cam, causing a change in the position of the forepart-guide 20 to govern the width of the sole-extension. At the termination of the operation upon the first shoe of a pair and to prepare for the other shoe, one of two horizontal projections 56, 56, spaced from each other about the periphery of a disk 58 fast upon the shaft 32 and which was resting initially against one side of a lever 60 fulcrumed upon the machine-head, in its rotation strikes the opposite side of the lever. This contact of the projection with the lever terminates the roation of the cam for the operation upon the first shoe and at the same time turns said lever about its fulcrum, and, through a link 62 joining the opposite end of the lever to the block 50, shifts said block in its ways upon the lever 48 to carry it to the opposite side of the fulcrum. The projection 52 is now so positioned that, when the slide-bar 44 is again depressed, it contacts with the projection 54 of the other slide 42 to remove the second guard 40 from its pawl 36. The oscillation of the lever 38 consequently rotates the cam 30 in the opposite direction to its first movement for the operation upon the second shoe of the pair.

Figure 4:
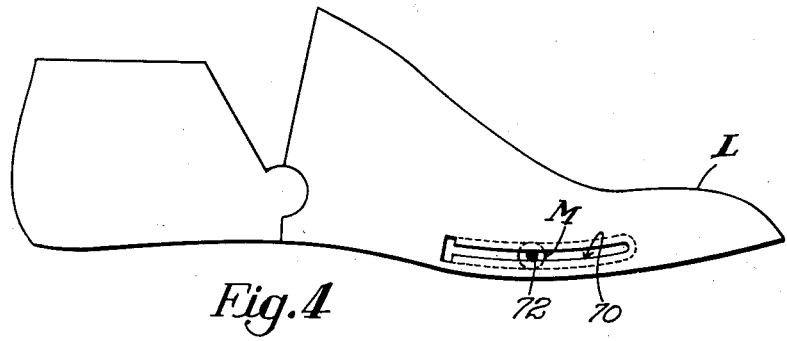
Fig. 4 shows a last upon which is mounted the controlling member of this invention.
Figure 5:
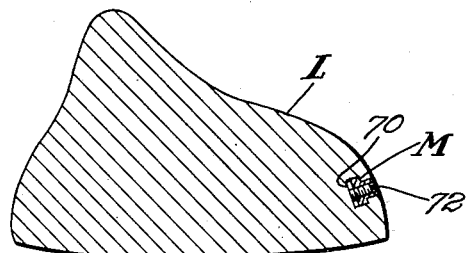
Fig. 5 is a transverse section through a portion of the last and member.

Heretofore, the lowering of the slide-bar 44 has been effected at a time determined by the operator, and as a result of the action of a knee-lever joined to the slide through a chain of connecting elements. The operator is also engaged in holding the work up to the guides during its feed by the machine and in bringing the forepart-guide 20 down to its active position. Under these conditions, if the starting of the cam 30 in rotation is tardy or premature, the point at which the change in the edge-extension occurs will be incorrectly located about the periphery of the sole. Such errors are avoided and the correctness of the extension assured by controlling the initiation of the cam-rotation by the work itself. To this end, we create in a portion of the work, in the present instance in the last, a special condition under the control of which the cam 30 is started in rotation when the work in its advance has assumed a predetermined relation to the chopping knife 10. This condition may be produced by applying to a last L flush with the surface thereof, at or near the point at which it is desired the rotation of the cam shall begin, a controlling device, this being shown in Figs. 1 to 5 as an iron member M, preferably of high magnetic permeability. The last, when carrying a shoe to be operated upon, is to be considered a part of the work. The member M is adapted to produce an electrical effect or change, in a sensing device P associated with the machine to be controlled, a pickup portion p of which device is carried by the forepart-guide 20. To permit convenient variation in the point in the advance of the work at which the controlling effect of the member M is to be exercised, it is mounted entirely within and for adjustment along an undercut slot 70 (Fig. 4 and 5) extending along the outer periphery of the forepart of the last. It is clamped in place by a screw 72 threaded through the member and engaging the inner wall of the slot to force the member against the opposite wall.

As is best illustrated in Fig. 3 of the drawings, the pickup portion p of the sensing device P includes a coil 74 having a spool 76, within which is an iron pole-piece 78. The pole-piece is clamped within the spool between a shoulder furnished by a terminal 80 upon the lower extremity of the pole-piece and a nut 82 threaded upon its upper portion. Surrounding the coil is an iron jacket 84 by which it is shielded from undesired effects of surrounding magnetic material, and by which there is produced a concentrated field, to be affected by the presence of the member M in a quite limited area. The coil is mounted for movement longitudinally of the forepart-guide by a loop 86 attached to the guide and surrounding the jacket. The end of a screw 88 threaded through the loop lies in a slot 90 extending longitudinally of the jacket and limiting the travel of the coil in opposite directions. An upward extension 92 of the core 78 is guided in an opening 94 through a bracket 96 projecting from the upper portion of the crease-guide, and surrounding the extension between the upper head of the jacket and the bracket is an expansion-spring 98. This spring normally urges down the coil to the extent permitted by contact of the upper end of the slot 90 with the screw 88, and yields as the work is pressed upward against a roll 100 rotatably mounted in the pole-piece-terminal 80. The coil 74 is joined by conductors 102 to another portion of the device P contained within a casing 103 carried by the column of the machine (Fig. 1). This portion of the device consists of an impedance-bridge $p'$, in one arm of which the coil 74 is included. This bridge may be conventional, having in the other three arms a balance-coil 104 and variable resistances 106, 106. To the apices of the bridge a low-voltage alternating current is supplied from a source 108.

The effect of change in the impedance of the bridge is transmitted through a transformer 110 to a vacuum-tube-amplifier 112, and the increased current applied to energize a relay 114. This relay, through its front contact, applies a relatively high voltage from a source joined to the circuit at 116 to the winding of a solenoid 118 mounted upon the machine-column. The normally elevated plunger 120 of the solenoid (Fig. 1) is connected by a link 122 to an arm 124 fixed to one end of a horizontal shaft 126 rotatable in the head of the machine. To the opposite end of the shaft an arm 128 is secured (Fig. 2), and this is joined by a link 130 to the slide-bar 44.

The rounding of a shoe, by the use of the machine illustrated, is carried out in the following manner: Having decided, for a particular last L, where the sole-extension for the shoe S it carries, and as controlled by the height of the forepart-gage 20, is to begin, the member M is located upon the last at a corresponding point, being secured in place in the slot 70. The work is presented to the machine between the bottom-rest 14 and the feed-arm 16 and is held up by the operator against the crease-guide 18. Upon the lowering of the forepart-guide 20 in the usual manner, to initiate a change in the position of the work as the point at which the sole-extension is to start approaches the knife 10, the crease-guide rises and the forepart-guide takes over the control of the width of the sole-edge. The pick-up-coil 74 is normally so lowered by its spring 98 that the roll 100 of the pole-piece 78 will be engaged by the uppers of all shoes to be operated upon, its spool being somewhat raised from the screw 88 by this contact. The coil therefore floats upon the work at a constant distance from the shoe-upper. The relation between the roll and the member M when the work is against the guides is such that the member, in the advance of the work, moves into substantial registration with the axis of the pole-piece. The magnetic member will produce its maximum effect in changing the reluctance of the magnetic circuit of the coil when it is in this alinement. The reluctance-change alters the inductance of the coil, and, since this coil is in an arm of the bridge $p'$ and since said bridge is adjusted to a normal balance, a current will flow in the circuit which connects the apices of the bridge with the transformer 110. The current in the transformer-secondary will be amplified at 112 to a magnitude sufficient to operate the relay 114, applying current from the source 116 to the solenoid 118.

The core of the solenoid will therefore be lowered and, through the intermediate connections, will draw down the slide-bar 44. The effect of this upon the machine will be the same as when the bar was actuated by the operator, one or the other of the slides 42 being moved to withdraw the corresponding guard 40 from its pawl 36, thus starting the rotation in the proper direction of the extension-controlling cam 30. The formation of the edge-extension is thus automatically initiated, without thought or effort on the part of the operator, by means positioned in a definite relation to the work itself and which is entirely free from interference with any operation to be performed. The controlling mechanism is uncomplicated, and, since the contact of the roll 100 with the shoe-upper maintains the spacing of the end of the pole-piece substantially the same for all of a run of shoes, the time of tripping of the cam mechanism when the member M is in substantial alinement with the pole-piece will be unvarying.

Having described the invention, what we claim as new and desire to secure by Letters Patent of the United States is:

1. In a sole-rounding machine in combination, a cutting tool for rounding the sole of a shoe on a last carrying a controlling member, a guide for positioning the shoe relatively to the tool, and means for operating said guide to vary the position of the shoe comprising an electrical sensing device arranged to create an electromagnetic field and to be activated by the presence of said controlling member in the field.

2. In combination, a machine having a tool for operating on the work, a guide variable in position to present work differently to the tool and mechanism by which the position of the guide is varied, means including a pickup-coil mounted on the guide and affected by the condition of the work, and electrical means responsive to changes in the pickup-coil for controlling the guide-positioning mechanism.

3. In combination, a machine having a tool for operating on the work, a guide variable in position to present advancing work differently to the tool and mechanism by which the position of the guide is varied, a pickup-coil carried by the guide, electrical means responsive to changes in the pickup-coil, a solenoid energized by the electrical means, and a member movable by the solenoid and by which the guide-positioning mechanism is controlled.

4. In combination, a machine having a tool for operating on the work, a guide variable in position to present advancing work differently to the tool and mechanism by which the position of the guide is varied, a pickup-coil yieldably mounted upon the guide and having a portion contacting with the advancing work, and electrical means responsive to changes in the pickup-coil for controlling the guide-positioning mechanism.

5. In combination, a machine having a tool for operating on the work, a guide variable in position to present advancing work differently to the tool and mechanism by which the position of the guide is varied, a pickup-coil yieldably mounted upon the guide and having a pole-piece contacting with the advancing work, and electrical means responsive to changes in the pickup-coil for controlling the guide-positioning mechanism.

RICHARD C. MARCY.
ROBERT R. PERRON.

(References on following page)

REFERENCES CITED

The following references are of record in the file of this patent:

UNITED STATES PATENTS

| Number | Name | Date |
|---|---|---|
| 132,118 | Tirrell | Oct. 8, 1872 |
| 871,987 | English | Nov. 26, 1907 |
| 887,214 | Monroe | May 12, 1908 |
| 1,247,893 | Stewart | Nov. 27, 1917 |
| 1,481,029 | Ross | Jan. 15, 1924 |
| 1,706,642 | Warren | Mar. 26, 1929 |
| 1,969,536 | Winne | Aug. 7, 1934 |
| 2,100,653 | Umansky | Nov. 30, 1937 |
| 2,127,707 | Topham et al. | Aug. 23, 1938 |
| 2,240,867 | Smith | May 6, 1941 |
| 2,332,573 | Hibschman et al. | Oct. 26, 1943 |
| 2,332,797 | Hume | Oct. 26, 1943 |
| 2,370,502 | Stratton | Feb. 27, 1945 |
| 2,438,986 | Ashworth | Apr. 6, 1948 |